United States Patent
Chou

(10) Patent No.: US 8,973,145 B2
(45) Date of Patent: Mar. 3, 2015

(54) ANTIVIRUS COMPUTING SYSTEM

(76) Inventor: Hung-Chien Chou, Taichung (TW)

(*) Notice: Subject to any disclaimer, the term of this patent is extended or adjusted under 35 U.S.C. 154(b) by 348 days.

(21) Appl. No.: 13/451,255

(22) Filed: Apr. 19, 2012

(65) Prior Publication Data

US 2012/0272321 A1    Oct. 25, 2012

(30) Foreign Application Priority Data

Apr. 21, 2011   (TW) .............................. 100113888 A

(51) Int. Cl.
*G06F 21/00* (2013.01)
*G06F 21/56* (2013.01)
*H04L 29/06* (2006.01)

(52) U.S. Cl.
CPC ............ *G06F 21/567* (2013.01); *H04L 63/145* (2013.01); *H04L 63/1416* (2013.01)
USPC ............................................. 726/24; 726/22

(58) Field of Classification Search
CPC .......................... H04L 63/1416; H04L 63/145
USPC ...................................................... 726/24, 22
See application file for complete search history.

(56) References Cited

U.S. PATENT DOCUMENTS

| | | | |
|---|---|---|---|
| 7,134,006 B2 | 11/2006 | Flanigan | |
| 7,657,941 B1 | 2/2010 | Zaitsev | |
| 2003/0191911 A1* | 10/2003 | Kleinschnitz et al. | 711/154 |
| 2007/0261118 A1* | 11/2007 | Lu | 726/24 |
| 2011/0078791 A1 | 3/2011 | Prakash et al. | |
| 2012/0030765 A1* | 2/2012 | Cheng et al. | 726/24 |

FOREIGN PATENT DOCUMENTS

| | | |
|---|---|---|
| EP | 1300745 | 4/2003 |
| WO | WO 98/12636 | 3/1998 |

* cited by examiner

*Primary Examiner* — Jeffrey Pwu
*Assistant Examiner* — Thong Truong
(74) *Attorney, Agent, or Firm* — Blakely Sokoloff Taylor & Zafman

(57) ABSTRACT

An antivirus computing system includes: a storage device having an operating partition that has stored therein a to-be-scanned file, and a hidden partition that has stored therein a virus code; and an antivirus device operatively associated with the storage device, and configured to perform a virus scan on the to-be-scanned file in the operating partition based on the virus code in the hidden partition.

12 Claims, 4 Drawing Sheets

ANTIVIRUS COMPUTING SYSTEM

CROSS-REFERENCE TO RELATED APPLICATION

This application claims priority of Taiwanese Application No. 100113888, filed on Apr. 21, 2011.

BACKGROUND OF THE INVENTION

1. Field of the Invention

The present invention relates to a computing system, more particularly to an antivirus computing system.

2. Description of the Related Art

Computer viruses are generally computer programs that self-duplicate and self-execute to perform malicious tasks. Referring to FIG. 1, a conventional antivirus system, which generally includes an antivirus program 113 and a virus code 114, is generally installed in an operating system 111 (e.g., Microsoft Windows 7) to perform virus detection and elimination tasks. The operating system 111 and the conventional antivirus system, together with other software programs 112 (e.g., Microsoft Office Suite), are installed in a hard-drive device 11, which is operatively associated with a central processing unit (CPU) 101, a memory unit 102, an interface module 103, a north-bridge chipset 104, and a south-bridge chipset 105 on a motherboard 10. During bootup, the operating system 111, the antivirus program 113, and the virus code 114 are loaded to the memory unit 102 for processing by the CPU 101. However, despite the use of the antivirus system, computer viruses may still exploit security loopholes of the operating system 111 to perform various malicious tasks. Further, although users may have preconfigured download passwords for updating the antivirus program 113 and the virus code 114, the download passwords are susceptible to theft attributed to the abovementioned security loopholes. When theft of the download passwords occurs, the users will no longer be able to update the antivirus program 113 and the virus code 114.

SUMMARY OF THE INVENTION

Therefore, an object of the present invention is to provide an antivirus computing system capable of alleviating the aforesaid drawbacks of the prior art.

Accordingly, an antivirus computing system of the present invention includes: a storage device having an operating partition that has stored therein a to-be-scanned file, and a hidden partition that has stored therein a virus code; and an antivirus device operatively associated with the storage device, and configured to perform a virus scan on the to-be-scanned file in the operating partition based on the virus code in the hidden partition.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
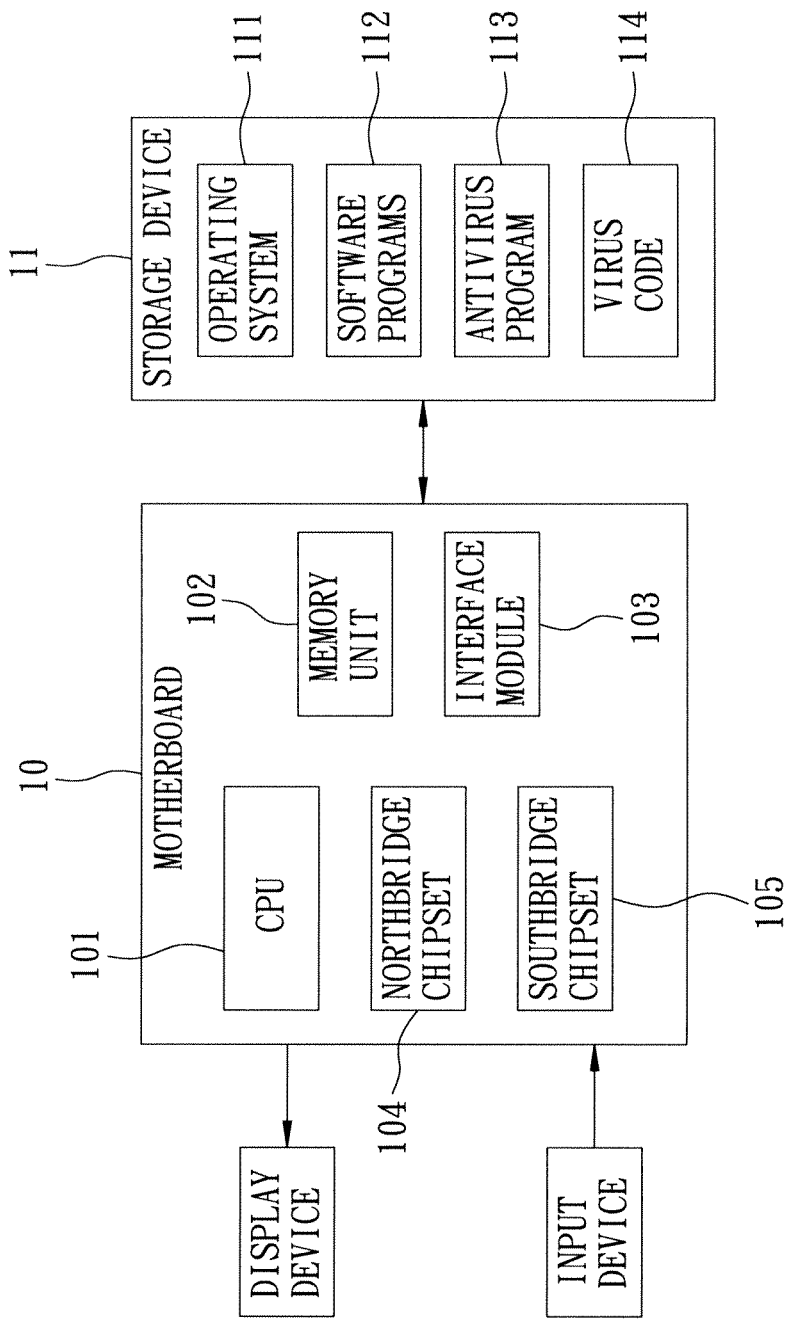
FIG. 1 is a schematic block diagram showing a conventional computing system without hardware-based antivirus capability.
Figure 2:
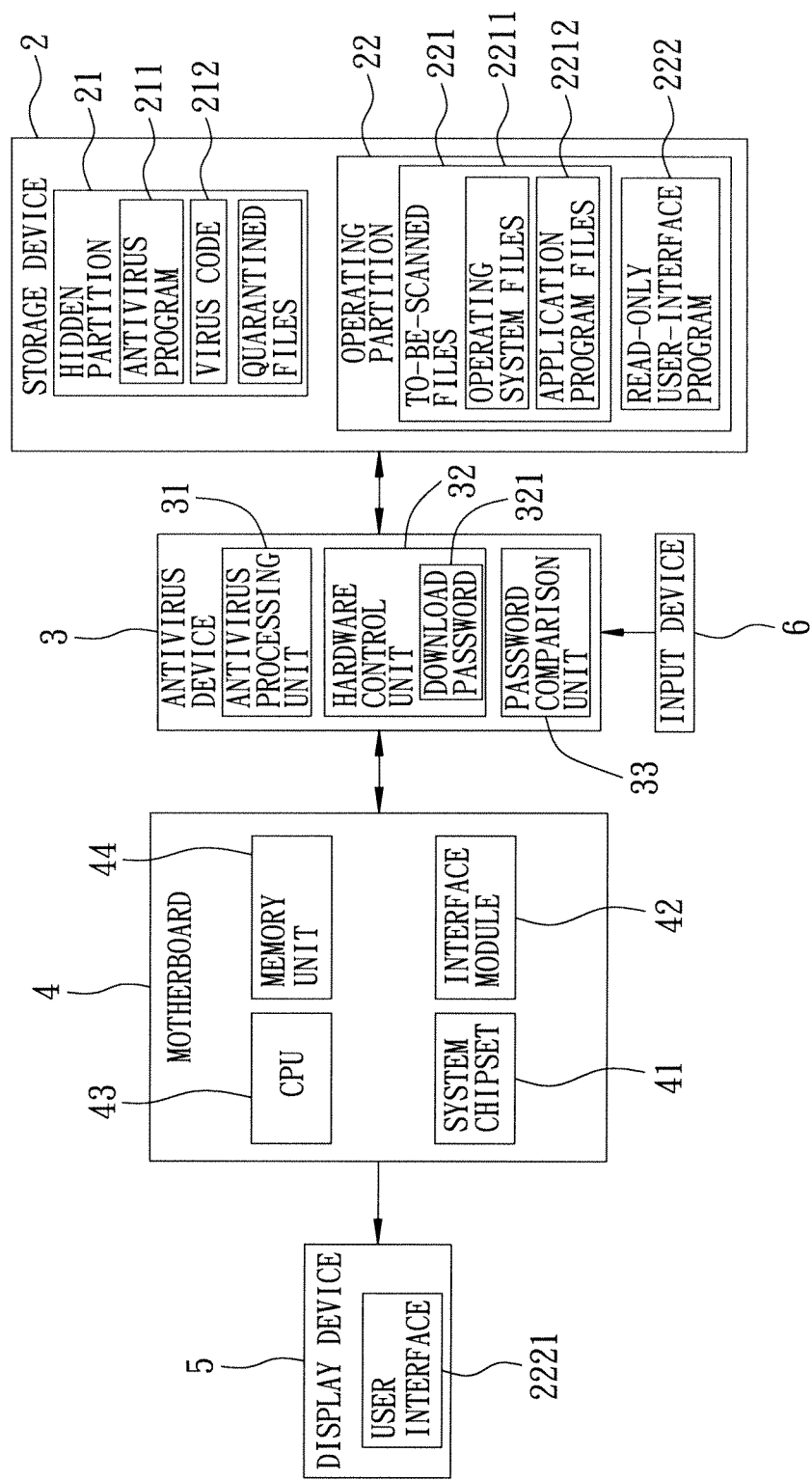
FIG. 2 is a schematic block diagram showing the preferred embodiment of an antivirus computing system according to the present invention.

Referring to FIG. 2, the preferred embodiment of an antivirus computing system according to the present invention may be implemented such as a desktop computer, a notebook computer, a tablet computer, and a smartphone, and includes a storage device 2, an antivirus device 3, an input device 6, and a display device 5 that are operatively associated with one another via a motherboard 4.

The motherboard 4 includes a system chipset 41, an interface module 42, a central processing unit (CPU) (or processor) 43, and a memory module 44. The system chipset 41 is one of a northbridge chipset, a southbridge chipset, a combination of northbridge and southbridge chipsets, and a dedicated chipset. The system chipset 41 is electrically connected to the storage device 2 via the antivirus device 3.

The interface module 42 may be, but is not limited to, one of local a local area network module, a universal serial bus module, a serial advanced technology attachment module, a parallel advanced technology attachment module, a peripheral controller interface module, a peripheral controller interface-express module, an accelerated graphic port module, a low pin count module, a wireless local area network module, a Bluetooth module, and an Institute Electrical and Electronics Engineers 1394 module. The interface module 42 coupled between the system chipset 41 and the antivirus device 3 to serve as a transmission interface therebetween.

The storage device 2 may be, but is not limited to, one of a hard-drive device, a solid-state drive device, a flash memory device, a static random access memory device, a synchronous dynamic random access memory device, and a double data rate synchronous dynamic random access memory device, and includes a hidden partition 21 and an operating partition 22.

The hidden partition 21 has stored therein an antivirus program 211 and a virus code 212. The operating partition 22 has stored therein a plurality of to-be-scanned files 221 including operating system files 2211 and application program files 2212, and a read-only user-interface program 222 that, when executed the CPU 43, causes the CPU 43 to enable visual presentation of a user interface 2221 on the display device 5 corresponding to the antivirus device 3.

The antivirus device 3 includes an antivirus processing unit 31, a hardware control unit 32, and a password comparison unit 33.

Figure 3:
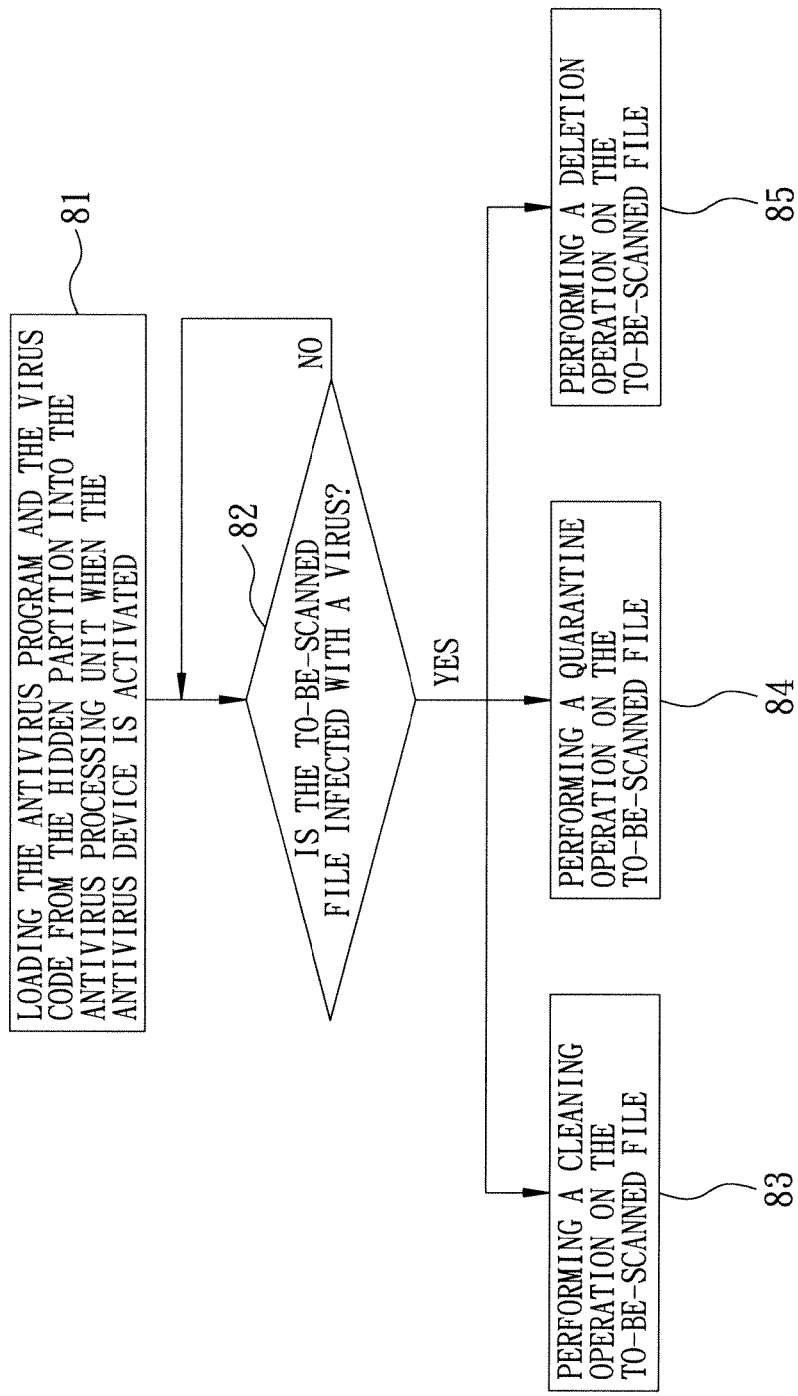
FIG. 3 is a flowchart showing steps of an update phase performed by the antivirus computing system.
Figure 4:
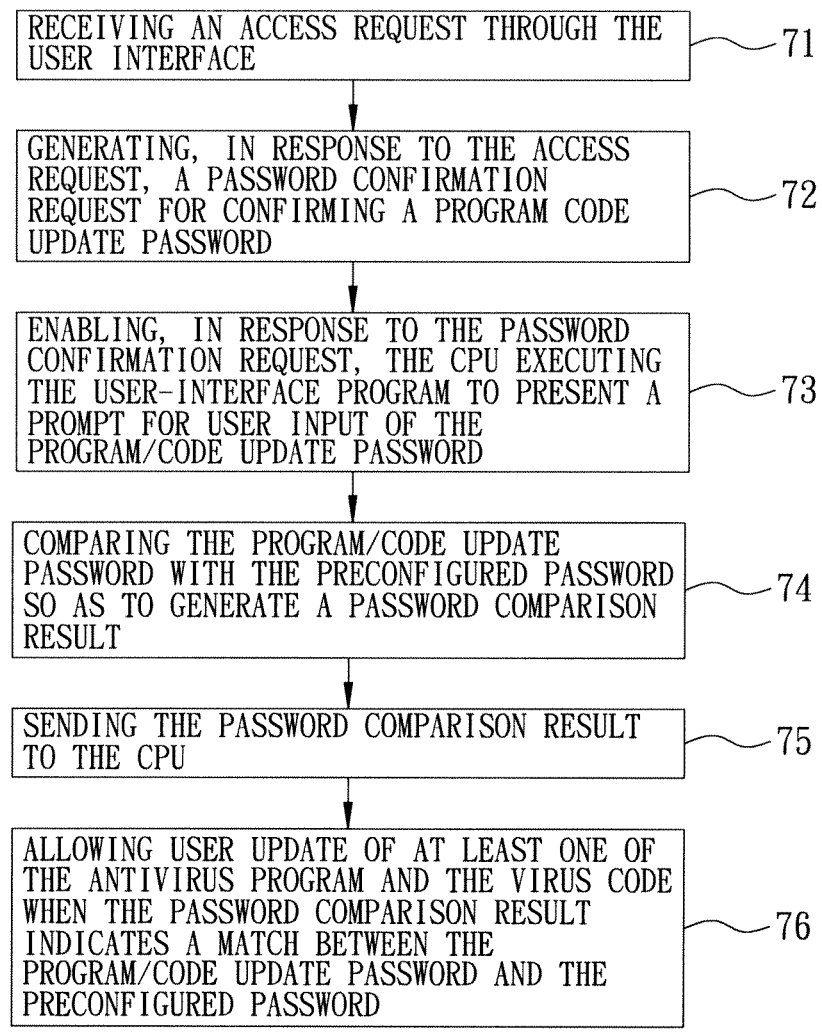
FIG. 4 is a flowchart showing steps of a protection phase performed by the antivirus computing system.

Operation of the antivirus computing system is ided into a protection phase (see FIG. 3) and an update phase (see FIG. 4) and.

The protection phase includes steps 81 to 85.

In step 81, the antivirus program 211 and the virus code 212 in the hidden partition 21 are loaded into the antivirus processing unit 31 when the antivirus device 3 is activated.

In step 82, for each of the to-be-scanned files 221, the antivirus processing unit 31 is configured to perform a virus scan on the to-be-scanned file 221 according to the antivirus program 211 and based on the virus code 212 so as to determine whether the to-be-scanned file 221 is infected with a virus.

Subsequently, the antivirus processing unit 31 is configured to perform one of a cleaning operation (step 83), a quarantine operation (step 84), and a deletion operation (step 85) on the to-be-scanned file 221 if a result of the virus scan indicates that the to-be-scanned file 221 is infected with a virus. Further, when performing the quarantine operation, the antivirus processing unit 31 quarantines each of the to-be-scanned files 221 that the antivirus processing unit 31 determines as being infected in the hidden partition 21.

The hardware control unit 32 is electrically interconnected between the system chipset 41 and the storage device 2, and serves to control access of the system chipset 41 to the hidden partition 21 and the operating partition 22, and has stored therein a preconfigured download password 321, which may be updated if needed.

Updating of the antivirus program 211 and/or the virus code 212 (i.e., the update phase) may be divided into steps 71 to 77.

When a user wishes to update the antivirus program 211 and/or the virus code 212, the user may input an access request through the user interface 2221.

In step 71, while executing the read-only user-interface program 222, the CPU 43 is further configured to receive the access request through the user interface 2221, and, in step 72, to generate, in response to the access request, a password confirmation request for confirming a program code update password that is used to control updating of the antivirus program 211 and the virus code 212.

In step 73, the hardware control unit 32 is configured to receive the password confirmation request from the CPU 43, and is responsive to the password confirmation request to enable the CPU 43 executing the user-interface program 222 to present a prompt on the display device 5 for user input of the program/code update password via the input device 6 (e.g., a keyboard device or a mouse device). The input device 6 is coupled operatively and directly to the antivirus device 3 in this embodiment.

In step 74, the password comparison unit 33 is then configured to compare the program/code update password inputted by the user with the preconfigured password 321 stored in the hardware control unit 32 so as to generate a password comparison result that is sent to the hardware control unit 32.

In step 75, the hardware control unit 32 is further configured to send the password comparison result to the CPU 43.

In step 76, the CPU 43 is configured to allow user update of at least one of the antivirus program 211 and the virus code 212 when the password comparison result indicates a match between the program/code update password and the preconfigured password.

Thus, the hardware control unit 32 is able to control access of the system chipset 41 to the hidden and operating partitions 21, 22. Moreover, the antivirus device 3 is able to control transmission of data inputted via the input device 6 to the system chipset 41.

In other embodiments of the present invention where the storage device 2 is a hard-drive device, the antivirus device 3 may be implemented as a hardware chip of an external hard-drive case in which the storage device 2 is mounted. To reiterate, when the external hard-drive case is first connected electrically to the motherboard 4, drivers corresponding to the antivirus device 3 and the user-interface program 222 must be installed to the operating partition 22 from such as a compact disc provided by the manufacture. Moreover, during the installation process, the user-interface program 222 is automatically configured to be read-only. After the user-interface program 222 is installed, the CPU 43 may enable visual presentation of the user interface 2221 on the display device 5 according to the user-interface program 222.

In summary, since the antivirus device 3 controls access of the system chipset 41 to the hidden partition 21 and performs virus scan according to the antivirus program 211 and the virus code 212 in the hidden partition 21, the antivirus device 3 is less susceptible to threats posed by securities loopholes of various operating systems. Furthermore, by virtue of the hardware control unit 32 and the password comparison unit 33, unauthorized update of the antivirus program 211 and the virus code 212 may be prevented.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. An antivirus computing system comprising:
a storage device having an operating partition that has stored therein a to-be-scanned file, and a hidden partition that has stored therein a virus code; and
an antivirus device associated with said storage device, and configure to perform a virus scan on the to-be-scan file in said operating partition based on said virus code in said hidden partition;
wherein said antivirus device includes an antivirus processing unit configured to perform the virus scan on the to-be-scanned file according to an antivirus program and based on the virus code;
said antivirus computing system further comprising a processor coupled to said antivirus device, and a display device coupled to said processor,
said operating partition further having stored therein a read-only user-interface program that, when executed by said processor, causes said processor to enable presentation of a user interface on said display device, to receive an access request through said user interface, and to generate, in response to the access request, a password confirmation request for confirming a program/code update password that is used to control updating of the antivirus program and the virus code.

2. The antivirus computing system as claimed in claim 1, wherein the antivirus program is stored in said hidden partition of said storage device, and the antivirus program in said hidden partition is loaded into said antivirus processing unit when said antivirus device is activated.

3. The antivirus computing system as claimed in claim 1, wherein said antivirus processing unit is further configured to perform one of a cleaning operation, a quarantine operation, and a deletion operation on the to-be-scanned file when a result of the virus scan indicates that the to-be-scanned file is infected with a virus.

4. The antivirus computing system as claimed in claim 3, wherein said antivirus processing unit is configured to quarantine the to-be-scanned file in said hidden partition when performing the quarantine operation.

5. The antivirus computing system as claimed in claim 1, wherein said antivirus device further includes a hardware control unit to receive the password confirmation request from said processor, and responsive to the password confirmation request to enable said processor executing said user-interface program to present a prompt on said display device for user input of the program/code update password.

6. The antivirus computing system as claimed in claim 5, wherein:
said antivirus device further includes a password comparison unit configured to compare the program/code update password inputted by a user with a preconfigured password in said hardware control unit so as to generate a password comparison result that is sent to said hardware control unit; and said hardware control unit is further configured to send the password comparison result to said processor executing said user-interface program, and to allow user update of at least one of the antivirus program and the virus code when the password comparison result indicates a match between the program/code update password inputted by the user and the preconfigured password in said hardware control unit.

7. The antivirus computing system as claimed in claim 5, further comprising a system chipset connected electrically to said storage device via said antivirus device, wherein said hardware control unit is further configured to control access of said system chipset to said operating and hidden partitions of said storage device.

8. The antivirus computing system as claimed in claim 7, further comprising an input device coupled operatively and directly to said antivirus device, said antivirus device controlling transmission of data inputted via said input device to said system chipset.

9. The antivirus computing system as claimed in claim 7, wherein said system chipset is one of a northbridge chipset, a southbridge chipset, a combination of northbridge and southbridge chipsets, and a dedicated chipset.

10. The antivirus computing system as claimed in claim 7, further comprising an interface module coupled between said system chipset and said antivirus device to serve as a transmission interface for the to-be-scanned file and the user-interface program.

11. The antivirus computing system as claimed in claim 10, wherein said interface module is selected from the group consisting of a local area network module, a universal serial bus module, a serial advanced technology attachment module, a parallel advanced technology attachment module, a peripheral controller interface module, a peripheral controller interface-express module, an accelerated graphic port module, a low pin count module, a wireless local area network module, a Bluetooth module, and an Institute of Electrical and Electronics Engineers 1394 module.

12. The antivirus computing system as claimed in claim 1, wherein said storage device is selected from the group consisting of a hard-drive device, a solid-state drive device, a flash memory device, a static random access memory device, a synchronous dynamic random access memory device, and a double data rate synchronous dynamic random access memory device.

* * * * *

UNITED STATES PATENT AND TRADEMARK OFFICE
CERTIFICATE OF CORRECTION

| | |
|---|---|
| PATENT NO. | : 8,973,145 B2 |
| APPLICATION NO. | : 13/451255 |
| DATED | : March 3, 2015 |
| INVENTOR(S) | : Hung-Chien Chou |

It is certified that error appears in the above-identified patent and that said Letters Patent is hereby corrected as shown below:

In the Claims, Column 4, Claim 1, line 22, please delete "configure" and insert --configured--, and delete "to-be-scan" and insert --to-be-scanned--.

Signed and Sealed this
Tenth Day of November, 2015

Michelle K. Lee
*Director of the United States Patent and Trademark Office*